United States Patent
Grossmann

[19]

[11] Patent Number: 5,875,696
[45] Date of Patent: Mar. 2, 1999

[54] FIXING A TOOL IN POSITION

[75] Inventor: Walter Grossmann, Baltmannsweiler, Germany

[73] Assignee: Index-Werke GmbH & Co. KG Hahn & Tessky, Esslingen, Germany

[21] Appl. No.: 769,543

[22] Filed: Dec. 19, 1996

[30] Foreign Application Priority Data

Dec. 22, 1995 [DE] Germany ................. 195 48 151.8
Dec. 7, 1996 [EP] European Pat. Off. ............. 96119655

[51] Int. Cl.⁶ ..................................................... B23B 29/34
[52] U.S. Cl. ................................ 82/159; 82/158; 82/121; 29/40
[58] Field of Search ............................. 82/159, 158, 120, 82/121; 29/326, 39, 40

[56] References Cited

U.S. PATENT DOCUMENTS

| 922,429 | 5/1909 | Hollm . |
| 3,402,625 | 9/1968 | Sweeny . |
| 3,490,318 | 1/1970 | McKenzie . |
| 3,498,653 | 3/1970 | McCreery . |
| 3,815,928 | 6/1974 | Komori . |
| 4,270,422 | 6/1981 | Andersson ................................ 82/158 |
| 4,453,435 | 6/1984 | Sauerwald et al. .................... 82/159 X |
| 4,714,390 | 12/1987 | Eckle et al. ............................ 82/159 X |
| 5,054,176 | 10/1991 | Wachter ..................................... 29/40 |
| 5,341,551 | 8/1994 | Brown et al. ............................. 29/40 |

FOREIGN PATENT DOCUMENTS

| 83049 | 7/1971 | German Dem. Rep. . |
| 27 36 412 | 3/1978 | Germany . |
| 33 30 653 | 3/1985 | Germany . |
| 39 29 802 | 11/1990 | Germany . |
| 42 07 353 | 9/1993 | Germany . |
| 563 058 | 7/1944 | United Kingdom . |
| 2 164 595 | 3/1986 | United Kingdom . |
| WO 93 23191 | 11/1993 | WIPO . |

Primary Examiner—Andrea L. Pitts
Assistant Examiner—Henry W. H. Tsai
Attorney, Agent, or Firm—Barry R. Lipsitz

[57] ABSTRACT

A tool fixing device for machine tools has a tool holder with a tool holder body for bearing the tool, and a tool carrier with a tool station. The tool station has a support surface and a receiver for receiving a shaft from the tool holder. An aligning device operative between the tool holder body and the tool carrier is used to position the tool holder body relative to the tool carrier, such that the tool holders in the respective tool station of the tool carrier need not be readjusted each time they are inserted. The aligning device has two aligning elements, one on the tool carrier, and the other on the tool holder body. When the shaft from the tool holder is clamped in the receiver on the tool station, the aligning elements fix the tool carrier so as to be aligned in a single position using form-fitting elements which engage in one another without clearance.

14 Claims, 8 Drawing Sheets

FIXING A TOOL IN POSITION

BACKGROUND OF THE INVENTION

The invention relates to a tool fixing device for machine tools, comprising a tool holder with a tool holder body bearing the tool and having a contact surface and a shaft projecting therefrom for clamping the tool holder, a tool carrier with a tool station comprising a support surface and a receiving means for the shaft, wherein the contact surface abuts on the support surface when the tool holder is clamped in the receiving means with its shaft, and an aligning device operative between tool holder body and tool carrier for positioning the tool holder body relative to the tool carrier, in particular with respect to rotation about a longitudinal axis of the shaft.

Such a tool fixing device is known from DE-PS 39 29 802.

With this device, two projections are arranged on the tool holder body out of necessity and these each bear a screw as adjusting element, in addition, wherein the tool holder body can be aligned relative to the tool carrier by means of adjusting elements acting on the two opposite end faces of the tool carrier.

This solution has the disadvantage that for each insertion into the tool station each tool holder body has to be adjusted by means of the adjusting devices in the inserted position since alterations in the surfaces of the tool carrier acted upon by the adjusting devices relative to the receiving means and, thus, inaccuracies result during multiple removal and insertion of the tool holder.

The object underlying the invention is therefore to improve a tool fixing device of the generic type such that the tool holders in the respective tool station of the tool carrier need not be readjusted each time they are inserted.

SUMMARY OF THE INVENTION

This object is accomplished in accordance with the invention, in a tool fixing device of the type described at the outset, in that the aligning device comprises a first and a second aligning element, the first of which is arranged on the tool carrier and the second on the tool holder body, and that when the shaft is clamped in the receiving means the aligning elements fix the tool holder body in position relative to the tool carrier, in particular with respect to the rotation about the longitudinal axis of the shaft, so as to be aligned in a single position by means of form-fitting elements engaging in one another without clearance.

The advantage of the inventive solution is to be seen in the fact that the form-fitting elements separate from the tool carrier offer the possibility of producing these in production steps conceived especially for them with the corresponding resistance to wear and tear, on the one hand, and with the desired precision, on the other hand, and thus provide the possibility, with form-fitting elements arranged relative to tool carrier and tool holder body once adjusted, of repeatedly reproducing the same alignment of the tool holder body in relation to the tool carrier by providing the form-fitting connection between the form-fitting elements.

It is particularly advantageous when the form-fitting elements can be brought into engagement in the tool station by a movement in insertion direction of the tool holder since it is then possible to provide the engagement between the form-fitting elements simultaneously with the insertion of the tool holder.

A particularly advantageous solution of the invention provides for one of the form-fitting elements to have a receiving means with facing fixing flanks and the other one of the form-fitting elements to have an insertion for the receiving means with outer flanks pointing in opposite directions, wherein the insert with its outer flanks can be inserted into the receiving means such that the outer flanks abut on the fixing flanks.

The fixing flanks can, in principle, extend parallel to one another. It is, however, particularly favorable when the fixing flanks have transversely to the insertion direction a distance which becomes smaller with increasing extension of the fixing flanks in insertion direction so that it is possible when inserting the tool holder to introduce the insert with its outer flanks into the receiving means with the fixing flanks and to cause the outer flanks to abut on the fixing flanks.

The outer flanks and the fixing flanks can, in principle, extend relative to one another such that when the insert is inserted between the fixing flanks the outer flanks and the fixing flanks abut punctually on one another. It is, however, advantageous, in particular in order to be able to transfer forces which are as large as possible by means of the form-fitting elements engaging in one another in a form-fitting manner, when the fixing flanks and the outer flanks are adapted to one another and abut on one another linearly at least in one direction.

In this respect, it is particularly advantageous when the outer flanks or the fixing flanks are of a convex design and the respectively other flanks have a smaller radius of curvature, are preferably flat in design, i.e. straight, so that even when the shape of the fixing flanks is not adapted quite ideally to the shape of the outer flanks the two can abut on one another with as great a radius of conformation as possible.

Since, however, large torques and therefore large forces acting on the form-fitting elements occur very often during lathe work, it is particularly advantageous when the form-fitting elements abut essentially areally on one another during their form-fitting engagement in one another.

Such an areal abutment may be realized particularly expediently when form-fitting elements abut on one another with fitting areas.

A solution which is particularly inexpensive as a result of its simplicity provides for the form-fitting elements to each be formed in one piece on the respective aligning element.

No details have so far been given concerning the type of arrangement of the first and second aligning elements.

A solution which is particularly favorable as a result of its simplicity provides for at least one of the aligning elements, preferably both, to be fixable in position after their exact adjustment, for example by means of screws. In such a case of a non-positive fixing in position of the aligning elements the possibility exists, in the case of a tool collision, of a displacement of the aligning elements being possible without any damage to them and the machine and this can be corrected again by readjustment.

Furthermore, it would, for example, be possible to accommodate the aligning elements themselves in an adjusting device and thus arrange the aligning elements themselves so as to be fixable in position relative to the tool carrier or to the tool holder body.

Such a solution would, however, be complicated and would always entail the risk of a subsequent disadjustment.

For this reason, a particularly advantageous embodiment provides for the aligning elements, after their exact adjustment relative to the tool carrier or tool holder body, to be fixed in position on them so as to be non-displaceable.

One possibility of connecting the aligning elements non-displaceably with the tool carrier and the tool holder body would be to weld on the aligning elements. This is, however, complicated and makes a later disassembly more difficult.

For this reason, a particularly advantageous embodiment provides for the aligning elements to be connected non-displaceably with the tool carrier or the tool holder body via form-fitting connections. An advantageous form-fitting connection of this type can be realized by means of pin connections attached after adjustment of the aligning elements.

The aligning elements could, in principle, be arranged arbitrarily.

It is, however, particularly favorable when the aligning element arranged on the tool carrier is seated on an outer surface thereof and thus is easily accessible for the purpose of assembly and, for example, also for adjustment.

Furthermore, it is favorable when the aligning element arranged on the tool holder body is seated on an outer surface of the tool holder body in order to likewise be easily accessible for the purpose of assembly and, for example, also for adjustment.

Particularly advantageous is a solution, in which the outer surface of the tool carrier bearing the aligning element and the outer surface of the tool holder body bearing the aligning element are aligned with one another.

A further, advantageous embodiment provides for the first aligning element and the form-fitting element associated with it to be located on a side of a plane defined by the support surface which faces away from the tool holder. As a result, all types of tool holders can be inserted into this tool station without it being possible for any hindrance of this insertion by the aligning element and the form-fitting element associated with it to occur.

A particularly advantageous embodiment of an inventive tool fixing device comprises a tool carrier with a plurality of tool stations, into which tool holders can be inserted, wherein at least two tool stations are each provided with a first aligning element which is adjusted such that a tool holder inserted into each of these tool stations and provided with a second aligning element is identically aligned in its respective operating position.

The advantage of the inventive solution is to be seen in the fact that due to the arrangement of the two aligning elements not only on the tool carrier but also on the tool holder body it is possible to adjust these during their arrangement not only on the tool carrier but also on the tool holder body and thereby compensate for all tolerances via these two adjusting possibilities. This means that when a tool holder prepared in this way is inserted into one of the tool stations of the tool carrier prepared in this way only the form-fitting elements still have to engage in one another in a form-fitting and clearance-free manner in order to obtain the alignment of the tool holder relative to the tool carrier already predetermined during the assembly of the fixing elements.

With this solution it is, therefore, possible to already determine the relative alignment of the tool holder to the tool carrier during the assembly of the aligning elements not only on the tool carrier but also on the tool holder body and so no subsequent adjustment whatsoever is required after insertion of each tool holder prepared in this way into each tool station of the tool carrier prepared in this way.

Additional features and advantages are the subject matter of the following description as well as of the drawings illustrating several embodiments.

DETAILED DESCRIPTION OF THE INVENTION

Figure 1:
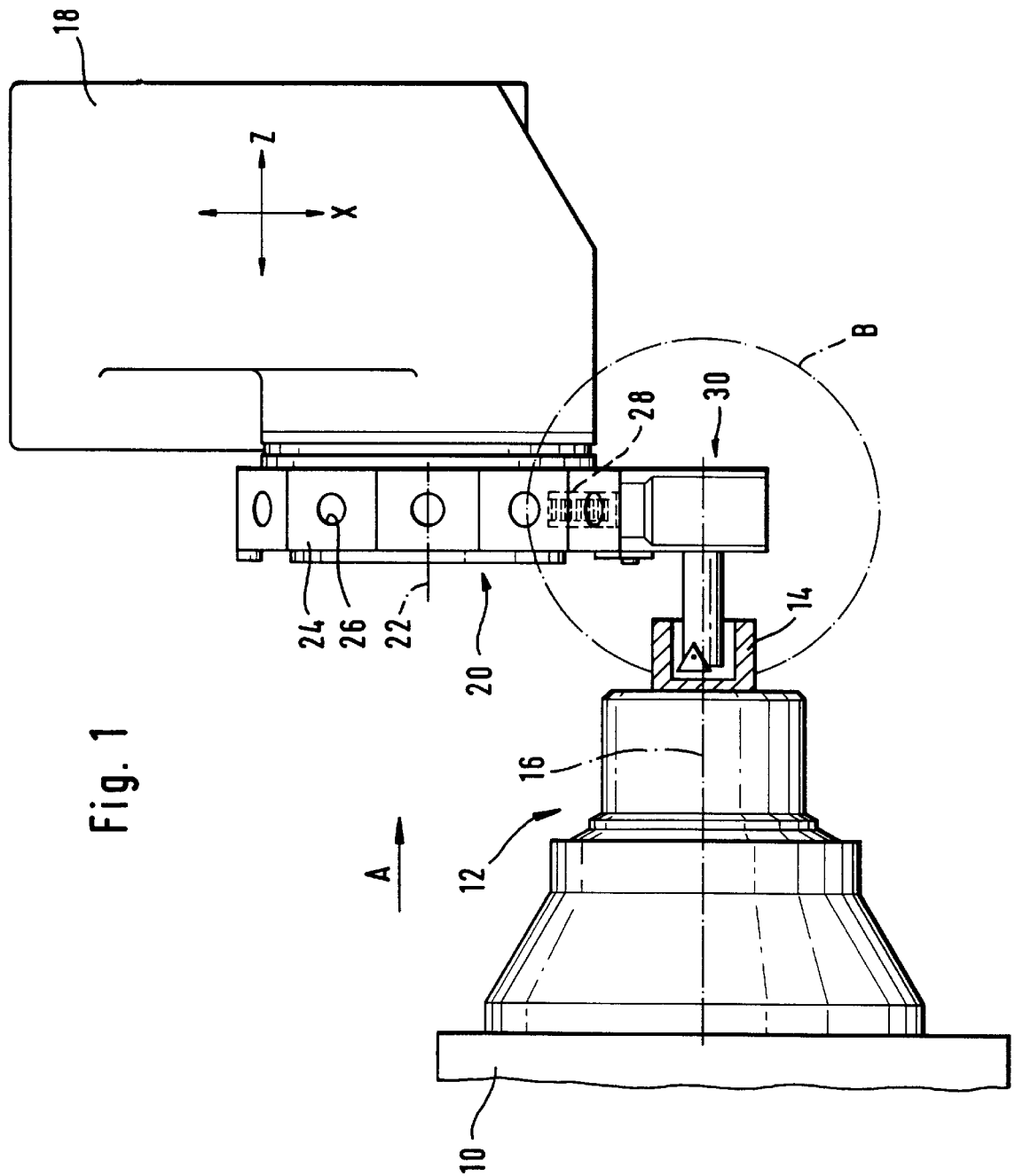
FIG. 1 shows a plan view of a section from a lathe with an inventive tool fixing device.

One embodiment of a lathe with an inventive tool fixing device comprises a spindle 12 arranged on a machine frame 10 for receiving a workpiece 14, wherein the spindle 12 is rotatable about a spindle axis 16.

A tool slide 18 is also mounted on the machine frame 10 for displacement, for example, in X and Z directions, wherein the tool slide 18 bears a turret which is designated as a whole as 20 and is rotatable about a turret indexing axis 22 which extends in this embodiment parallel to the spindle axis 16.

Figure 2:
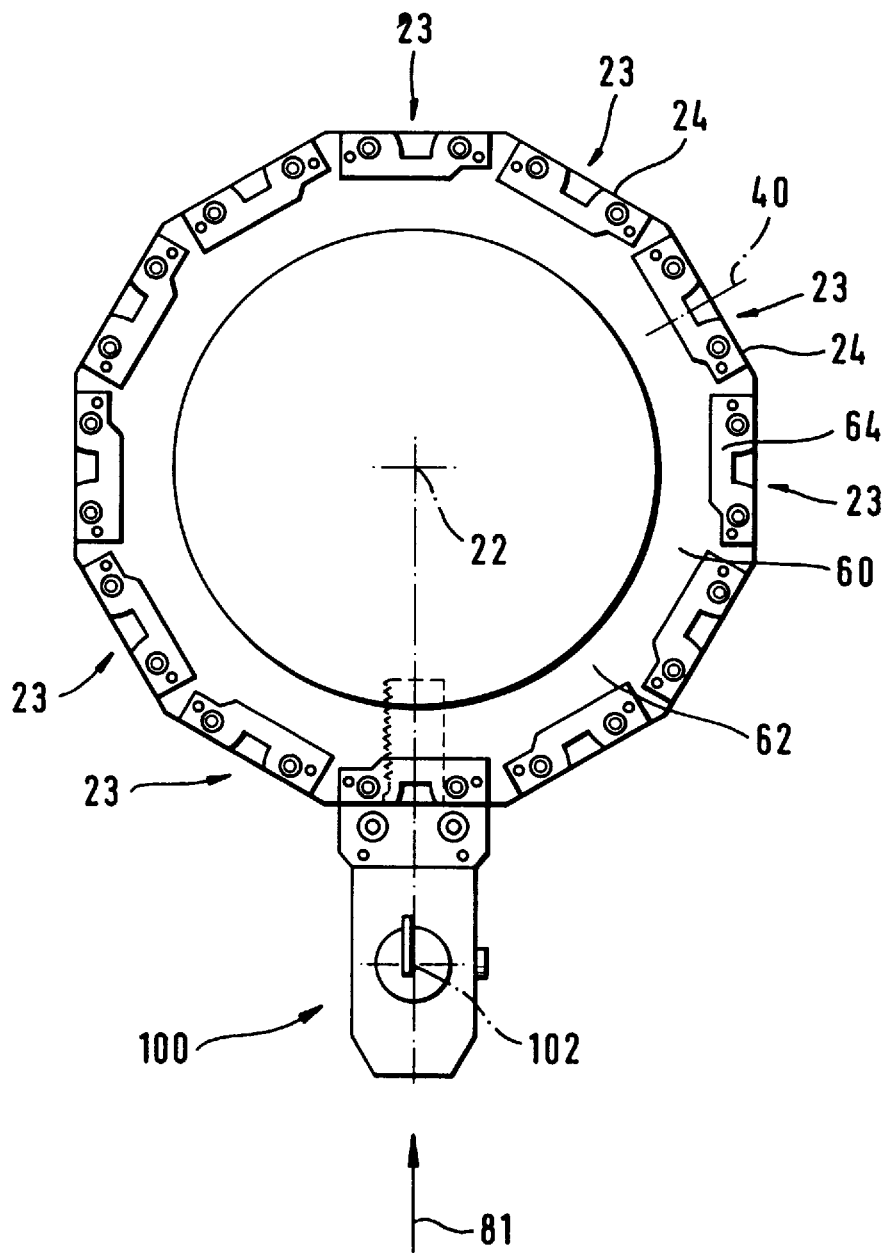
FIG. 2 shows a plan view of the turret in the direction of arrow A in FIG. 1.

The turret 20 has, as illustrated in FIGS. 1 and 2, a plurality of tool stations 23 on its outer casing, each of which comprises a support surface 24 which is designed as a plane surface and surrounds a receiving means 26 for a shaft 28 of a tool holder 30.

Figure 3:
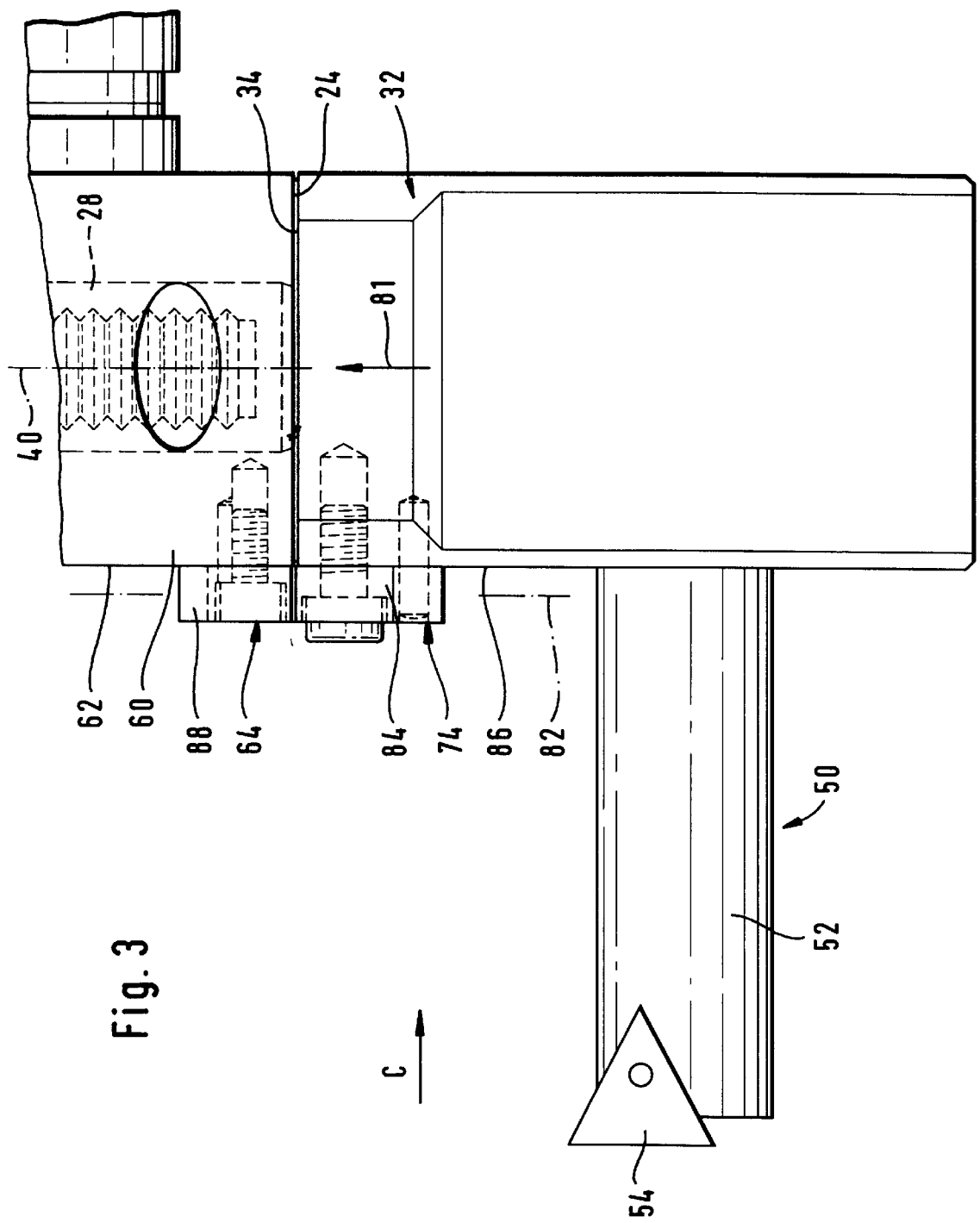
FIG. 3 shows an enlarged illustration of tool holder and turret in a region B in FIG. 1.
Figure 4:
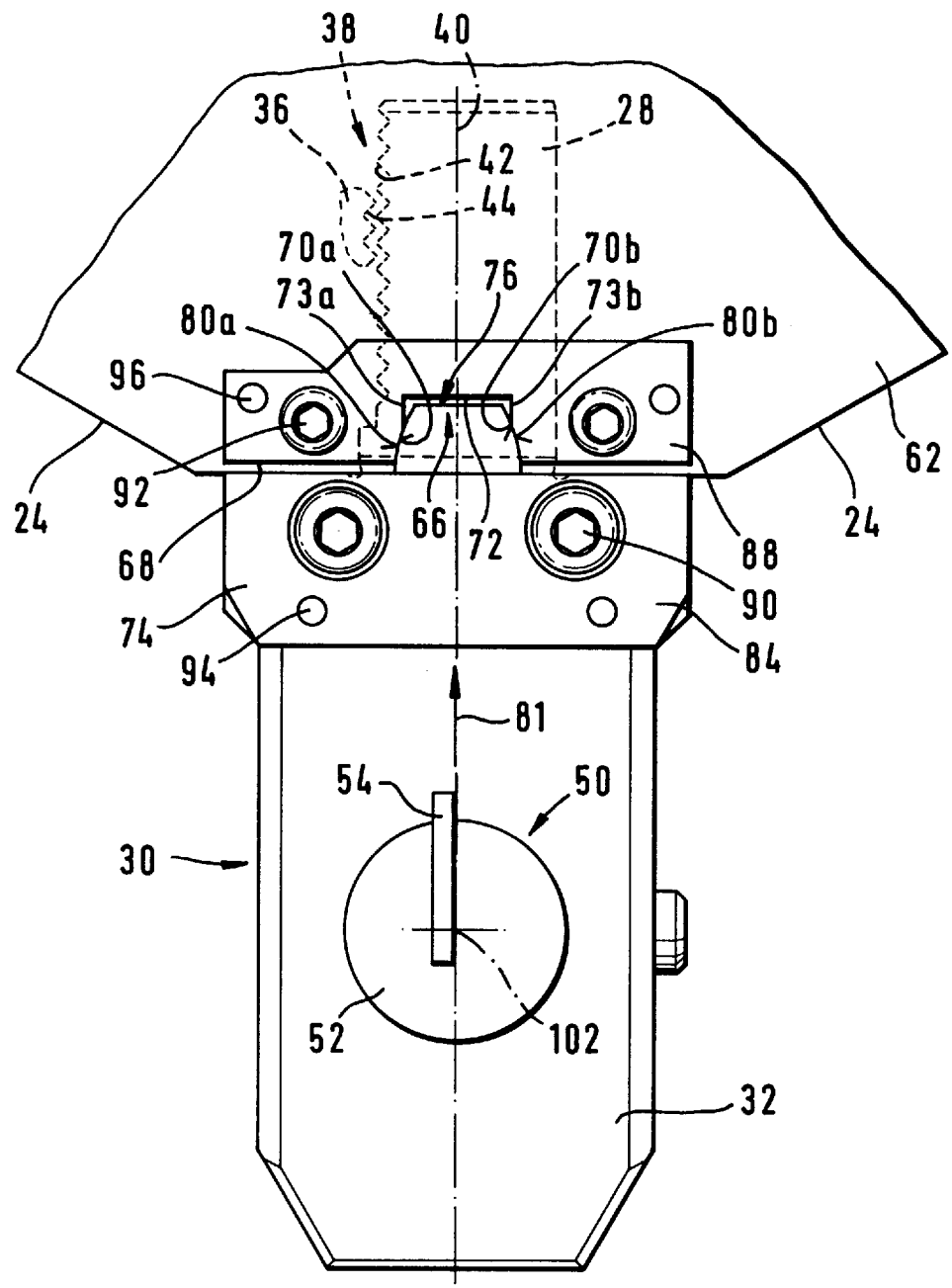
FIG. 4 shows a plan view of tool holder and turret in the direction of arrow C in FIG. 3.
Figure 5:
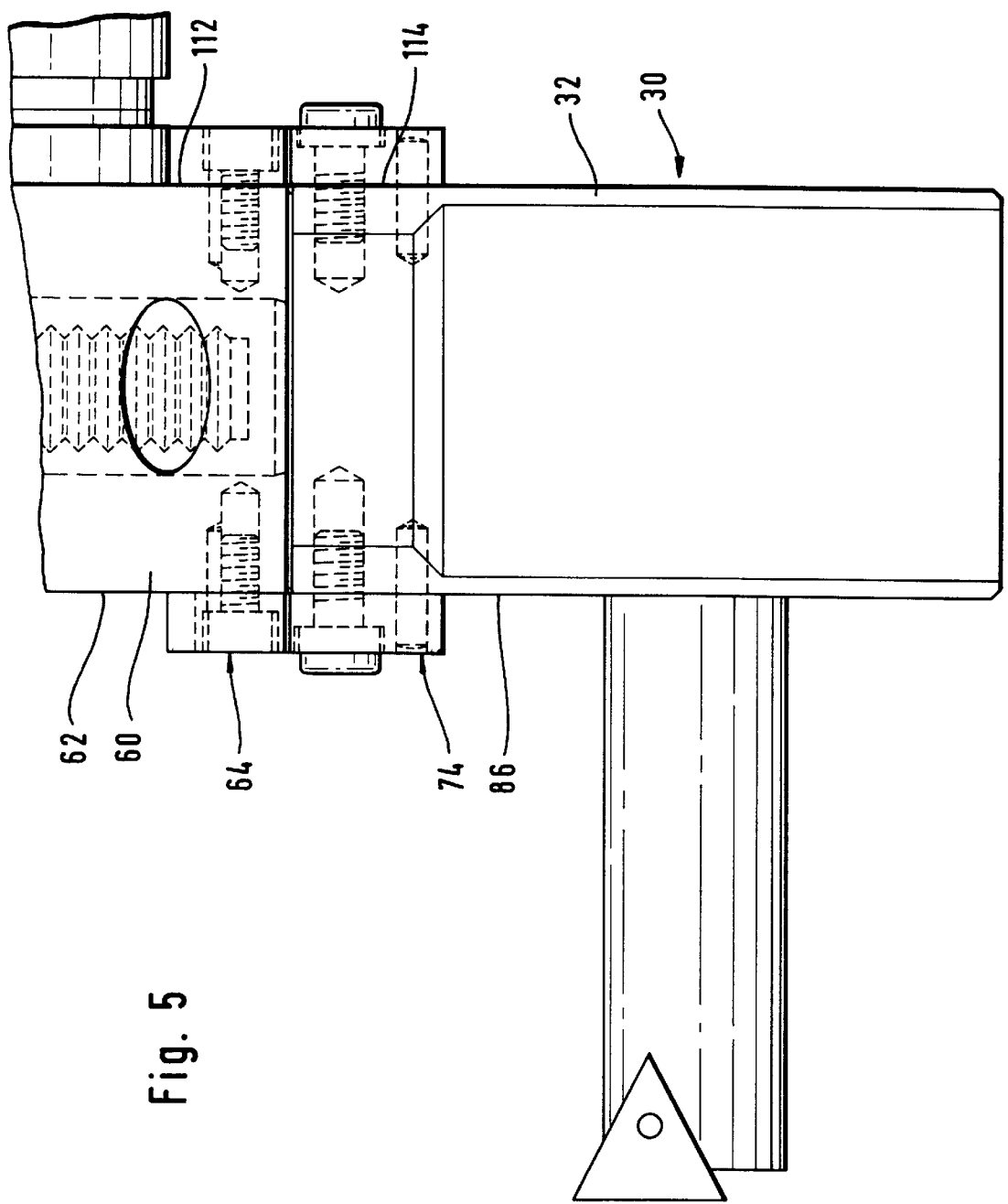
FIG. 5 shows an illustration of a second embodiment of an inventive tool fixing device similar to FIG. 3.

As illustrated in FIGS. 3 and 4, the tool holder 30 comprises a tool holder body 32 with a contact surface 34 which can be supported on the support surface 24 of the turret 20. In addition, the shaft 28, which engages in the receiving means 26 when the contact surface 34 abuts on the support surface 24 and which can be firmly clamped by means of a clamping element 36 of a clamping device, is held at the tool holder body 32.

The shaft 28 is preferably designed as a cylindrical shaft in accordance with German Industrial Standard DIN 69880 and has a flattened area 38 either on one side or on two opposite sides, this flattened area being provided with teeth 42 which extend transversely to a longitudinal axis 40 of the shaft extending in radial direction in relation to the turret indexing axis 22 and with which the clamping element 36 likewise provided with teeth 44 meshes.

The clamping element 36 thereby acts on the shaft 28 with a force which presses the contact surface 34 against the support surface 24.

In addition, a tool which is designated as a whole as 50 and comprises, for example, a cutting plate holder 52 with a cutting plate 54 is also held at the tool holder body 32 of the tool holder 30.

For the exact alignment of the tool holder 30 relative to the turret 20, a turret head 60 is provided, for example, not only with the support surfaces 24 but also bears, for example, on its end face 62, as illustrated in particular in FIGS. 2 and 3, a first aligning element 64 which, as illustrated in FIG. 4, has a recess 66 as form-fitting element. This recess 66 extends from a side 68 facing the tool holder 30 into the fixing element 64 and has oppositely located fixing flanks 70a and 70b which extend between the side 68 of the aligning element 64 facing the tool holder 30 and a base side 72 of the recess 66 but preferably end at least with their end regions facing the base side 72 at a distance from the base side 72 so that surface sections 73a, b are located between these end regions and the base side 72 which do not contribute to any form fitting and, for example, extend approximately parallel to one another.

A second aligning element 74 corresponds to the first aligning element 64 and has as form-fitting element a tooth-like projection 76 which engages in the recess 66 when the tool holder 30 is securely mounted on the turret 20 and thereby abuts with outer flanks 80a and 80b on the fixing flanks 70a, b in a form-fitting manner but has no contact with the surface sections 73a, b.

The two fixing flanks 70a, b are preferably arranged relative to one another such that they have transversely to an insertion direction 81 of the tool holder 30 a distance from one another which becomes smaller with increasing extension in the insertion direction 81 so that when the projection 76 having the outer the outer flanks 80a, b is introduced between the fixing flanks 70a, b the outer flanks 80a, b of the projection 76 can abut on the fixing flanks 70a, b without clearance and in the clamped position of the tool holder 30 this clearance-free position is maintained.

In this respect, it is particularly advantageous when the outer flanks 80a, b are of a convex shape, for example in the shape of tooth flanks of a gear wheel, and the fixing flanks 70a, b of the recess 66 are of a plane design so that the outer flanks 80a, b and the fixing flanks 70a, b abut on one another with as great a radius of conformation as possible, despite not abutting on one another over their entire surfaces, so that an areal or areal-like abutment nevertheless results and their punctual or linear abutment on one another can be avoided.

The recess 66 and the projection 76 thereby extend in a plane 82 which extends parallel to the longitudinal axis 40 of the shaft 28, flank areas of the fixing flanks 70a, b and outer flanks 80a, b extending, in addition, transversely to the plane 82.

The tooth-like projection 76 is, for example, formed in one piece on a plate-like aligning element body 84 which is mounted on an end face 86 of the tool holder body 32, the end face 86 preferably being aligned with the end face 62 of the turret head 60.

The first aligning element 64 also comprises a plate-like aligning element body 88 which is provided with the recess 66 and abuts on the end face 62 of the turret head 60.

Both aligning element bodies 84, 88 are connected either to the tool holder body 32 or the turret head 60 by means of screws 90 and 92, respectively, and, in addition, are fixed in their exactly adjusted position by means of pins 94, 96.

As illustrated in FIG. 2, a first aligning element 64 can be associated with each tool station 23, wherein in each tool position 23 the aligning element 64 can be adjusted by means of a master tool holder 100 which is provided with a second aligning element 74 and is, for example, aligned such that a tool axis 102 extends parallel to the spindle axis 16.

The first aligning element 64 is aligned on the turret head 60 in accordance with this alignment of the master tool holder 100 with the second aligning element 74 securely connected thereto, for example fixed in position by means of the screws 92, and following the fixing in position is additionally pinned to the turret head 60 with the pins 96 and thus fixed in position so as to be non-displaceable relative to the turret head 60.

This means that a definite rotational alignment of each tool holder 30 in relation to rotation about the longitudinal axis 40 of the shaft 28 can be specified for each individual tool station 23 of the turret head 60 so that each tool holder 30 located in operating position has in each tool station 23 exactly the same alignment relative to the spindle axis 16.

In the same way, the second aligning element 74 on each tool holder body 32 can be adjusted in that this is placed on a master tool station, which is not illustrated in the drawings but is provided with a stationarily aligned, first aligning element 64, and aligned such that the tool axis 102 has a defined orientation relative to the master tool station. In this position of the tool holder body 32, the second aligning element 74 is fixed in position, for example, by means of the screws 90 and subsequently fixed in this position, in addition, by the pins 94 so as to be non-displaceable in relation to the tool holder body 32.

Each tool holder 30 with a second aligning element 74 adjusted in this manner can therefore be inserted into each tool station 23 of the turret head 60 provided with a first aligning element 64 adjusted in accordance with the above comments, wherein the tool axis 102 has the same orientation in each tool station 23 located in operating position.

In a second embodiment of an inventive tool fixing device, the first aligning element 64 is arranged not only on the front end face 62 of the turret head 60 but also on a rear end face 112 and in the same way a second aligning element 74 is held not only on the end face 86 of the tool holder body 32 corresponding to the end face 62 but also on the end face 114 corresponding to the rear end face 112.

Such a double arrangement of a pair consisting of a first and a second aligning element can be used advantageously, in particular, when large machining forces are to be transferred from the turret head 60 to the tool holder 30 and thus large torques also occur in respect of a rotation of the tool holder 30 about the longitudinal axis 40.

Figure 6:
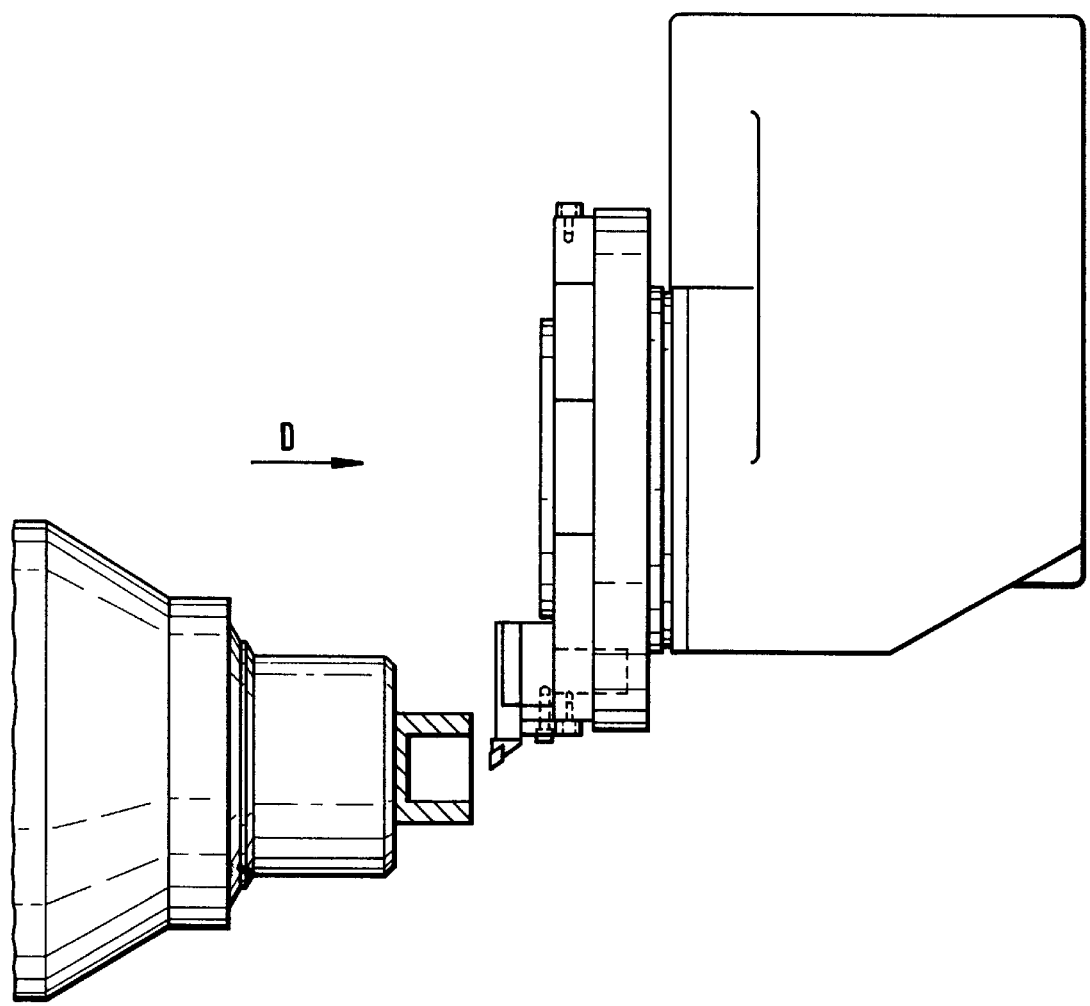
FIG. 6 shows an illustration of a section from a lathe with a third embodiment of an inventive tool fixing device similar to FIG. 1.
Figure 7:
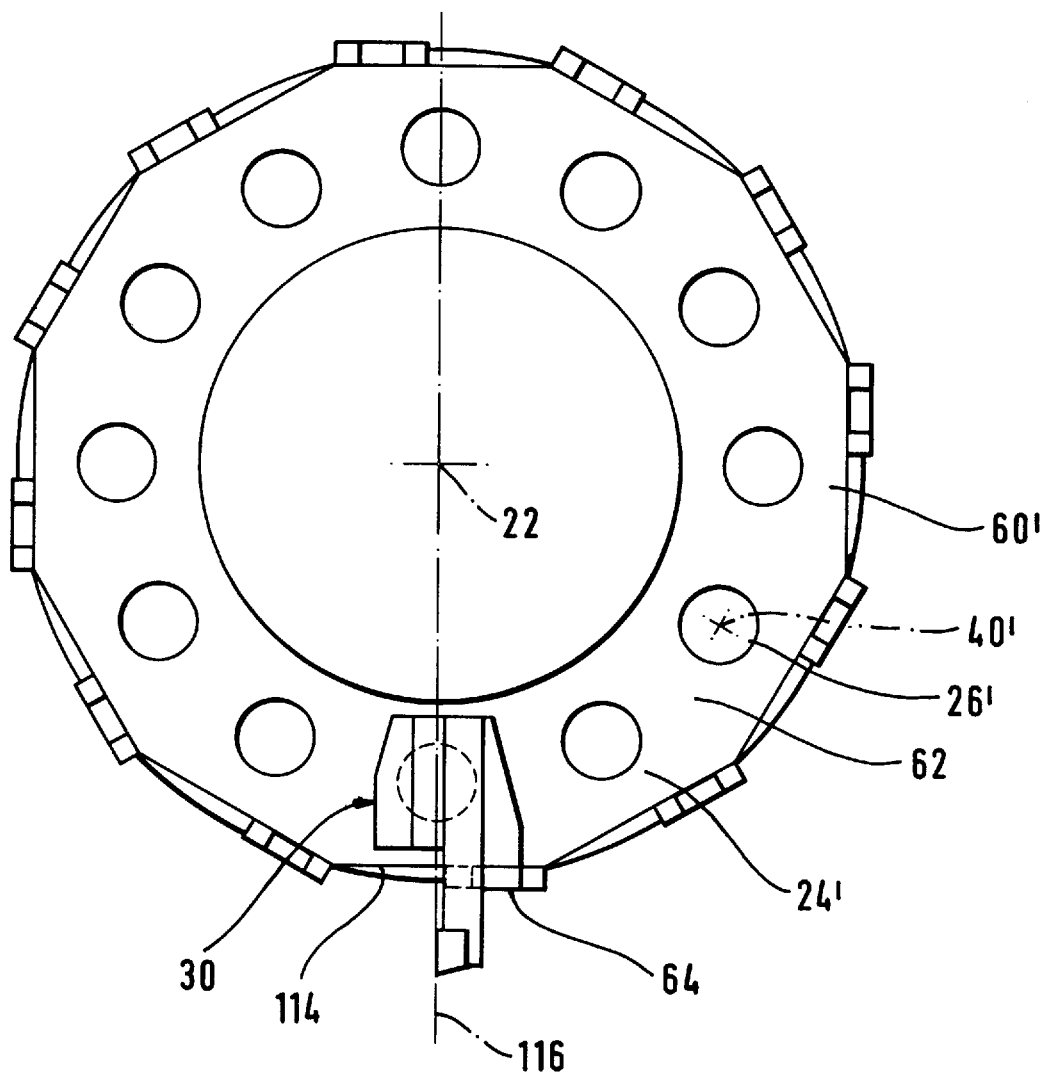
FIG. 7 shows a plan view of the turret in the direction of arrow D in FIG. 6

In a third embodiment of an inventive tool fixing device, illustrated in FIGS. 6 and 7, the turret head 60' is provided with receiving means 26', the longitudinal axes 40' of which extend parallel to the turret indexing axis 22 so that, for example, the front end face 62 or also the rear end face of the turret head 60' form support surfaces 24' surrounding the receiving means 26' for the contact surfaces 34 of the tool holder 30.

In this case, the first aligning elements 64 are arranged on casing surfaces 114 extending parallel to the turret indexing axis 22, preferably on plane sections thereof, and are connected to the turret head 60 in the same way as in the first embodiment.

The second aligning elements 74 held on the end faces 86 of the tool holder bodies 32 then engage with their tooth-like projections 76 into the recesses 66 in the same way as that described for the first embodiment in order to provide a form-fitting fixing against rotation of the tool holder 30 relative to the longitudinal axis 40 of the shaft 28.

In this case, the aligning elements 64 and 74 are, for example, arranged asymmetrically to the turret indexing axis 22 and the straight lines 116 intersecting the longitudinal axis 40'.

Figure 8:
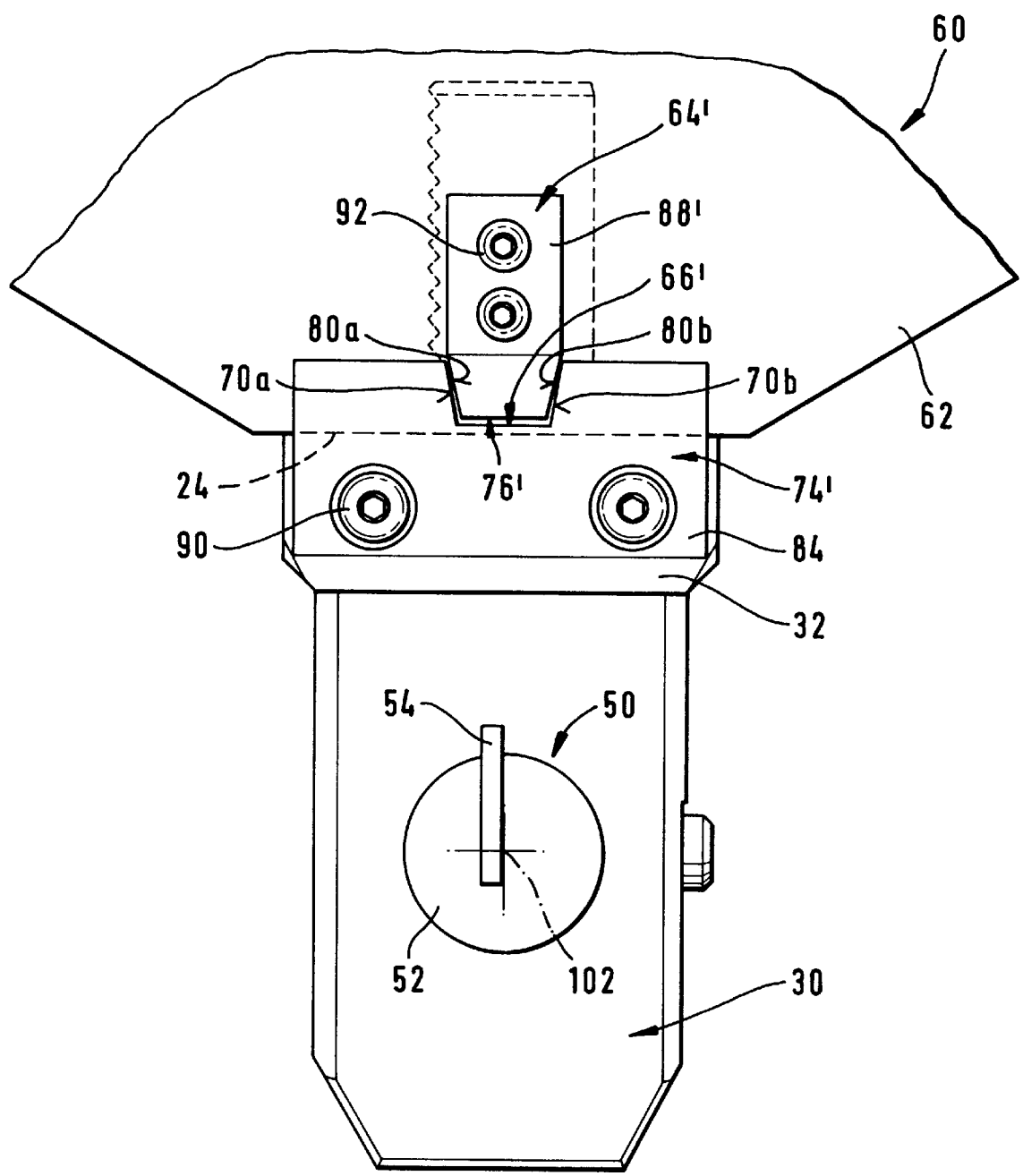
FIG. 8 shows a plan view similar to FIG. 4 of a fourth embodiment.

In a fourth embodiment, illustrated in FIG. 8, the first aligning element 64 comprises, in contrast to the embodiments described in the above, the form-fitting element 76' with the outer flanks 80a and 80b while the second aligning element 74 which is arranged on the tool holder body 32 has the form-fitting element 66' with the fixing flanks 70a and 70b.

In the present case, the fixing flanks 70a and 70b are designed such that they form plane flank surfaces which represent the sides of a trapezoid.

Furthermore, the aligning element 64' is designed such that it has an aligning element body 88' which extends parallel to the end face 62 of the turret head 60 merely over a width which corresponds to a width of the tooth-like projection 76 forming the form-fitting element.

However, in this embodiment, as well, the form-fitting element 76' is located on a side of the plane defined by the support surface 24 facing away from the tool holder 30.

To provide the form-fitting connection, it is therefore necessary for the form-fitting element 66' to also be located on this side of the plane defined by the support surface 24. Therefore, proceeding from its region abutting on the tool holder body 32, the aligning element body 84 extends beyond the contact surface 34 thereof and in this case engages over the end face 62 of the turret head 60.

Moreover, it is provided in the fourth embodiment for not only the aligning element 64' but also the aligning element 74' to be fixed in position on the turret head 60 and the tool holder body 32, respectively, by means of screws 92 and 90, respectively, wherein a non-positive fixing in position of the aligning element 64' or 74' in the adjusted position takes place by means of the screws 92 and 90, respectively, and this can be overcome in the case of collisions of the tool.

As for the rest, the fourth embodiment is designed in the same way as the first embodiment and so reference is made in full to the explanations concerning the first embodiment.

The present disclosure relates to the subject matter disclosed in german application no. 195 48 151.8 of Dec. 22, 1995 and in european application no. 96119655.7 of Dec. 7, 1996, the entire specifications of which are incorporated herein by reference.

I claim:

1. A tool fixing device for machine tools, comprising a tool holder with a tool holder body bearing a tool and having a contact surface and a shaft projecting therefrom for clamping the tool holder, a tool carrier with a tool station, comprising a support surface and a receiving means for the shaft, wherein the contact surface abuts on the support surface when the tool holder is clamped in the receiving means with its shaft, and an aligning device operative between the tool holder body and the tool carrier respectively for positioning the tool holder body relative to the tool carrier, said aligning device comprising a first and a second aligning element, the first aligning element being arranged on the tool carrier and the second aligning element on the tool holder body, at least one of the first aligning element arranged on the tool carrier and the second aligning element arranged on the tool holder body being a part separate from the tool carrier or tool holder body upon which it is arranged, and adapted to be adjustable with respect to its position on the tool carrier or the tool holder body before being fixedly connected to the tool carrier or tool holder body, the aligning elements being adapted to fix the tool holder body in position relative to the tool carrier so as to be aligned in a single position by means of form-fitting elements engaging in one another without clearance.

2. A tool fixing device as defined in claim 1, wherein the form-fitting elements are adapted to be brought into engagement in the tool station by a movement in insertion direction of the tool holder.

3. A tool fixing device as defined in claim 1, wherein one of the form-fitting elements has a receiving means with facing fixing flanks and the other one of the form-fitting elements has an insert for the receiving means with outer flanks converging in insertion direction of the tool holder.

4. A tool fixing device as defined in claim 3, wherein the fixing flanks have transversely to the insertion direction a distance becoming smaller with increasing extension of the fixing flanks in the insertion direction.

5. A tool fixing device as defined in claim 3, wherein the fixing flanks and the outer flanks are adapted to one another and abut on one another linearly at least in one direction.

6. A tool fixing device for machine tools, comprising:

a tool holder with a tool holder body bearing a tool and having a contact surface and a shaft projecting therefrom for clamping the tool holder;

a tool carrier with a tool station, comprising a support surface and a receiving means for the shaft, wherein the contact surface abuts on the support surface when the tool holder is clamped in the receiving means with its shaft; and an aligning device operative between the tool holder body and the tool carrier respectively for positioning the tool holder body relative to the tool carrier, wherein:

the aligning device comprises a first and a second aligning element, the first aligning element being arranged on the tool carrier and the second aligning element on the tool holder body, when the shaft is clamped in the receiving means the aligning elements fix the tool holder body in position relative to the tool carrier so as to be aligned in a single position by means of form-fitting elements engaging in one another without clearance, one of the form-fitting elements has a receiving means with facing fixing flanks and the other one of the form-fitting elements has an insert for the receiving means with outer flanks converging in insertion direction of the tool holder, and the fixing flanks or the outer flanks are of a convex design.

7. A tool fixing device as defined in claim 1, wherein the form-fitting elements abut over corresponding areas on one another during their form-fitting engagement in one another.

8. A tool fixing device as defined in claim 7 wherein the form-fitting elements abut on one another with fitting areas.

9. A tool fixing device as defined in claim 1, wherein the form-fitting elements are each formed in one piece on the respective aligning element.

10. A tool fixing device as defined in claim 1, wherein after their exact adjustment relative to the tool carrier or tool holder body, the aligning elements are fixed in position on the tool carrier or tool holder body so as to be non-displaceable.

11. A tool fixing device as defined in claim 10, wherein the aligning elements are non-displaceably connected to the tool carrier or the tool holder body via form-fitting connections.

12. A tool fixing device as defined in claim 1, wherein the first aligning element and the form-fitting element associated with it extend from a plane defined by the support surface in a direction away from the tool holder.

13. A tool fixing device as defined in claim 1, wherein:

the tool carrier has a plurality of tool stations, tool holders are insertable into said stations, and at least two tool stations are each provided with a first aligning element adjusted such that a tool holder, inserted into each of these tool stations and provided with a second aligning element, is identically aligned in its respective operating position.

14. A machine tool, comprising a receiving means for a workpiece and a tool fixing device in accordance with claim 1, wherein the workpiece and the tool fixing device are movable relative to one another.

* * * * *